United States Patent
Yoo et al.

(10) Patent No.: US 7,848,619 B2
(45) Date of Patent: Dec. 7, 2010

(54) RECORDING MEDIUM HAVING DATA STRUCTURE FOR MANAGING TO RESUME REPRODUCTION OF VIDEO DATA RECORDED THEREON AND RECORDING AND REPRODUCING METHODS AND APPARATUSES

(75) Inventors: Jea Yong Yoo, Seoul (KR); Byung Jin Kim, Kyunggi-do (KR); Mi Hyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 972 days.

(21) Appl. No.: 10/815,708

(22) Filed: Apr. 2, 2004

(65) Prior Publication Data

US 2004/0228618 A1  Nov. 18, 2004

(30) Foreign Application Priority Data

Apr. 4, 2003  (KR) ...................... 10-2003-0021251

(51) Int. Cl.
*H04N 5/00* (2006.01)
(52) U.S. Cl. ...................... 386/125; 386/126
(58) Field of Classification Search .................. 386/1, 386/46, 69, 125–126, 30
See application file for complete search history.

(56) References Cited

U.S. PATENT DOCUMENTS

| | | | |
|---|---|---|---|
| 5,521,898 A | 5/1996 | Ogasawara | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,691,972 A | 11/1997 | Tsuga et al. | |
| 5,734,788 A | 3/1998 | Nonomura et al. | |
| 5,742,569 A | 4/1998 | Yamamoto et al. | |
| 5,784,528 A | 7/1998 | Yamane et al. | |
| 5,884,004 A | 3/1999 | Sato et al. | |
| 5,913,010 A | 6/1999 | Kaneshige et al. | |
| 5,917,781 A | 6/1999 | Kim | |
| 5,923,869 A * | 7/1999 | Kashiwagi et al. | 713/501 |
| 5,933,410 A | 8/1999 | Nakane et al. | |

(Continued)

FOREIGN PATENT DOCUMENTS

CN  1212427  3/1999

(Continued)

OTHER PUBLICATIONS

Japanese Office Action dated Dec. 25, 2007.

(Continued)

*Primary Examiner*—Thai Tran
*Assistant Examiner*—Nigar Chowdhury
(74) *Attorney, Agent, or Firm*—Harness, Dickey & Pierce, P.L.C.

(57) ABSTRACT

The present invention relates to a data structure for managing to resume reproduction of data including at least video data recorded on a recording medium. A recording medium having the data structure has data recorded thereon that comprises: at least one data playing unit (title or movie object) including at least video data; and navigation information for managing the data playing unit, wherein the navigation information includes control information to indicate whether resumption of the data playing unit is permitted or not.

22 Claims, 7 Drawing Sheets

U.S. PATENT DOCUMENTS

| | | | |
|---|---|---|---|
| 5,953,290 A | 9/1999 | Fukuda et al. | |
| 5,999,694 A | 12/1999 | Yasuda et al. | |
| 5,999,698 A | 12/1999 | Nakai et al. | |
| 6,009,234 A | 12/1999 | Taira et al. | |
| 6,014,495 A | 1/2000 | Moriyama et al. | |
| 6,064,385 A | 5/2000 | Sturgeon et al. | |
| 6,064,796 A | 5/2000 | Nakamura et al. | |
| 6,067,400 A * | 5/2000 | Saeki et al. | 386/95 |
| 6,084,581 A | 7/2000 | Hunt | |
| 6,088,507 A | 7/2000 | Yamauchi et al. | |
| 6,097,676 A | 8/2000 | Fujinami | |
| 6,118,927 A | 9/2000 | Kikuchi et al. | |
| 6,130,869 A | 10/2000 | Tokoro et al. | |
| 6,167,189 A | 12/2000 | Taira et al. | |
| 6,215,746 B1 | 4/2001 | Ando et al. | |
| 6,219,488 B1 | 4/2001 | Mori et al. | |
| 6,247,022 B1 | 6/2001 | Yankowski | |
| 6,285,825 B1 | 9/2001 | Miwa et al. | |
| 6,292,226 B1 | 9/2001 | Yamanaka et al. | |
| 6,308,005 B1 | 10/2001 | Ando et al. | |
| 6,321,027 B2 | 11/2001 | Honjo | |
| 6,336,002 B1 | 1/2002 | Yamauchi et al. | |
| 6,356,971 B1 | 3/2002 | Katz et al. | |
| 6,360,055 B1 | 3/2002 | Kaneshige et al. | |
| 6,373,803 B2 | 4/2002 | Ando et al. | |
| 6,377,474 B1 | 4/2002 | Archambeault et al. | |
| 6,377,518 B1 | 4/2002 | Auwens et al. | |
| 6,377,747 B1 | 4/2002 | Murase et al. | |
| 6,381,404 B1 | 4/2002 | Decarmo | |
| 6,385,388 B1 | 5/2002 | Lewis et al. | |
| 6,392,969 B1 | 5/2002 | Heo | |
| 6,393,430 B1 | 5/2002 | Van Ryzin | |
| 6,415,101 B1 | 7/2002 | DeCarmo et al. | |
| 6,424,793 B1 | 7/2002 | Setogawa et al. | |
| 6,424,797 B1 | 7/2002 | Murase et al. | |
| 6,430,122 B1 | 8/2002 | Hamada et al. | |
| 6,532,334 B1 | 3/2003 | Kikuchi et al. | |
| 6,570,837 B1 | 5/2003 | Kikuchi et al. | |
| 6,580,870 B1 | 6/2003 | Kanazawa et al. | |
| 6,584,277 B2 | 6/2003 | Tsumagari et al. | |
| 6,615,192 B1 | 9/2003 | Tagawa et al. | |
| 6,647,496 B1 | 11/2003 | Tagawa et al. | |
| 6,700,839 B1 | 3/2004 | Auflick et al. | |
| 6,727,421 B2 | 4/2004 | Izawa et al. | |
| 6,763,345 B1 | 7/2004 | Hempleman et al. | |
| 6,766,103 B2 | 7/2004 | Kim et al. | |
| 6,782,192 B1 | 8/2004 | Tanaka et al. | |
| 6,795,499 B1 | 9/2004 | Kato et al. | |
| 6,798,981 B1 | 9/2004 | Yamauchi et al. | |
| 6,832,293 B1 | 12/2004 | Tagawa et al. | |
| 6,859,421 B2 | 2/2005 | Sawabe et al. | |
| 6,904,227 B1 | 6/2005 | Yamamoto et al. | |
| 6,912,218 B1 | 6/2005 | Jeon | |
| 6,914,863 B2 | 7/2005 | Ono | |
| 6,965,727 B1 | 11/2005 | Sawabe et al. | |
| 6,999,674 B1 | 2/2006 | Hamada et al. | |
| 7,006,758 B1 | 2/2006 | Yamamoto et al. | |
| 7,050,384 B2 | 5/2006 | Sasaki | |
| 7,065,287 B1 | 6/2006 | Heredia et al. | |
| 7,113,694 B2 | 9/2006 | Kim et al. | |
| 7,236,687 B2 | 6/2007 | Kato et al. | |
| 2001/0014070 A1 | 8/2001 | Ando et al. | |
| 2001/0026679 A1 | 10/2001 | Koshino et al. | |
| 2001/0030710 A1 | 10/2001 | Werner | |
| 2001/0036358 A1 | 11/2001 | Kim et al. | |
| 2001/0043790 A1 | 11/2001 | Saeki et al. | |
| 2001/0053280 A1 | 12/2001 | Yamauchi et al. | |
| 2002/0018416 A1 | 2/2002 | Heo | |
| 2002/0041557 A1 | 4/2002 | Heo | |
| 2002/0046328 A1 | 4/2002 | Okada | |
| 2002/0071351 A1 * | 6/2002 | Hamada et al. | 369/30.24 |
| 2002/0093556 A1 | 7/2002 | Ishizawa et al. | |
| 2002/0093886 A1 | 7/2002 | Ijichi et al. | |
| 2002/0106196 A1 | 8/2002 | Yamauchi et al. | |
| 2002/0126994 A1 | 9/2002 | Gunji et al. | |
| 2002/0129036 A1 | 9/2002 | Ho Yuen Lok et al. | |
| 2002/0135608 A1 | 9/2002 | Hamada et al. | |
| 2002/0145702 A1 | 10/2002 | Kato et al. | |
| 2002/0159368 A1 | 10/2002 | Noda et al. | |
| 2002/0177914 A1 | 11/2002 | Chase | |
| 2002/0180803 A1 | 12/2002 | Kaplan et al. | |
| 2003/0035681 A1 | 2/2003 | Ho | |
| 2003/0058948 A1 | 3/2003 | Kelly et al. | |
| 2003/0063528 A1 | 4/2003 | Ogikubo | |
| 2003/0103604 A1 | 6/2003 | Kato et al. | |
| 2003/0118327 A1 | 6/2003 | Um et al. | |
| 2003/0123346 A1 | 7/2003 | Ishii et al. | |
| 2003/0123845 A1 | 7/2003 | Koda et al. | |
| 2003/0147322 A1 | 8/2003 | Ono | |
| 2003/0161615 A1 | 8/2003 | Tsumagari et al. | |
| 2003/0235404 A1 | 12/2003 | Seo et al. | |
| 2004/0014136 A1 | 1/2004 | Ishii et al. | |
| 2004/0019396 A1 | 1/2004 | McMahon et al. | |
| 2004/0047588 A1 | 3/2004 | Okada et al. | |
| 2004/0047591 A1 | 3/2004 | Seo et al. | |
| 2004/0062529 A1 | 4/2004 | Yen | |
| 2004/0076402 A1 | 4/2004 | Jung et al. | |
| 2004/0114908 A1 | 6/2004 | Ito | |
| 2004/0156621 A1 | 8/2004 | Seo et al. | |
| 2004/0208135 A1 | 10/2004 | Nakamura et al. | |
| 2004/0213105 A1 | 10/2004 | Seo et al. | |
| 2004/0220791 A1 | 11/2004 | Lamkin et al. | |
| 2005/0013590 A1 | 1/2005 | Ando et al. | |
| 2005/0019007 A1 | 1/2005 | Kato et al. | |
| 2005/0025459 A1 | 2/2005 | Kato et al. | |
| 2005/0036763 A1 | 2/2005 | Kato et al. | |
| 2006/0013564 A1 | 1/2006 | Hamada et al. | |
| 2006/0110132 A1 | 5/2006 | Takakuwa et al. | |
| 2006/0222340 A1 | 10/2006 | Yamauchi et al. | |
| 2007/0140653 A1 * | 6/2007 | Kozuka et al. | 386/95 |

FOREIGN PATENT DOCUMENTS

| | | |
|---|---|---|
| CN | 1220458 | 6/1999 |
| CN | 1239574 | 12/1999 |
| CN | 1272209 | 11/2000 |
| CN | 1288572 | 3/2001 |
| CN | 1310445 | 8/2001 |
| CN | 1317200 | 10/2001 |
| CN | 1320926 | 11/2001 |
| CN | 1346491 | 4/2002 |
| CN | 1393872 | 1/2003 |
| CN | 1251680 | 8/2003 |
| CN | 1205793 | 11/2003 |
| CN | 1163673 | 6/2004 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606356 | 4/2005 |
| CN | 1606357 | 4/2005 |
| CN | 1611071 | 4/2005 |
| CN | 1364387 | 11/2005 |
| CN | 1383679 | 1/2006 |
| EP | 0723216 | 7/1996 |
| EP | 0724264 | 7/1996 |
| EP | 0737009 | 10/1996 |
| EP | 0831647 | 3/1998 |
| EP | 0836183 | 4/1998 |
| EP | 0836189 | 4/1998 |
| EP | 0858073 | 8/1998 |
| EP | 0872839 | 10/1998 |
| EP | 0949622 | 10/1999 |

| | | |
|---|---|---|
| EP | 1024494 | 8/2000 |
| EP | 1050880 | 11/2000 |
| EP | 1059635 | 12/2000 |
| EP | 1103974 | 5/2001 |
| EP | 1126454 | 8/2001 |
| EP | 1041565 | 9/2001 |
| EP | 1148503 | 10/2001 |
| EP | 1041569 | 1/2002 |
| EP | 1191531 | 3/2002 |
| EP | 1198132 | 4/2002 |
| EP | 1198133 | 4/2002 |
| EP | 1 205 933 | 5/2002 |
| EP | 1209681 | 5/2002 |
| EP | 1089283 | 7/2002 |
| EP | 1 271 526 A2 | 1/2003 |
| EP | 1280348 | 1/2003 |
| EP | 1398965 | 3/2004 |
| EP | 1469677 | 10/2004 |
| EP | 1391119 | 6/2006 |
| EP | 1604367 | 12/2009 |
| JP | 3-19971 | 8/1991 |
| JP | 3199243 | 8/1991 |
| JP | 08-273304 | 10/1996 |
| JP | 9-135421 | 5/1997 |
| JP | 10-032780 | 2/1998 |
| JP | 10-040667 | 2/1998 |
| JP | 11-69308 | 3/1999 |
| JP | 11-69309 | 3/1999 |
| JP | 11-96653 | 4/1999 |
| JP | 11-120747 | 4/1999 |
| JP | 11-161663 | 6/1999 |
| JP | 11-213522 | 8/1999 |
| JP | 11-213627 | 8/1999 |
| JP | 11-259985 | 9/1999 |
| JP | 2002-150685 | 9/1999 |
| JP | 1999-296997 | 10/1999 |
| JP | 2000-021130 | 1/2000 |
| JP | 2000-067522 | 3/2000 |
| JP | 2000-149405 | 5/2000 |
| JP | 2000-195235 | 7/2000 |
| JP | 2000-222822 | 8/2000 |
| JP | 2000-235779 | 8/2000 |
| JP | 2000-235780 | 8/2000 |
| JP | 12-331466 | 11/2000 |
| JP | 2000-322827 | 11/2000 |
| JP | 2000-348442 | 12/2000 |
| JP | 2001-024985 | 1/2001 |
| JP | 2001-157145 | 6/2001 |
| JP | 2001-157208 | 6/2001 |
| JP | 2001-169246 | 6/2001 |
| JP | 2001-195809 | 7/2001 |
| JP | 2001-332006 | 11/2001 |
| JP | 2001-359072 | 12/2001 |
| JP | 2002-025231 | 1/2002 |
| JP | 2002-082838 | 3/2002 |
| JP | 2002-083486 | 3/2002 |
| JP | 2002-112201 | 4/2002 |
| JP | 2002-158972 | 5/2002 |
| JP | 2002-158974 | 5/2002 |
| JP | 2002-222581 | 8/2002 |
| JP | 2002-288255 | 10/2002 |
| JP | 2002-352515 | 12/2002 |
| JP | 3379961 | 12/2002 |
| JP | 3392838 | 1/2003 |
| JP | 3392849 | 1/2003 |
| JP | 2003-068057 | 3/2003 |
| JP | 2003-199047 | 7/2003 |
| JP | 2003-520514 | 7/2003 |
| JP | 2005-513936 | 5/2005 |
| JP | 2005-251392 | 9/2005 |
| KR | 1996-38743 | 11/1996 |
| KR | 1996-38744 | 11/1996 |
| KR | 1996-38901 | 11/1996 |
| KR | 1996-38905 | 11/1996 |
| KR | 1999-0022858 | 3/1999 |
| KR | 1999-0079482 | 11/1999 |
| KR | 2000-0053633 | 8/2000 |
| KR | 2001-0022702 | 3/2001 |
| KR | 2001-0028735 | 4/2001 |
| KR | 2001-0051898 | 6/2001 |
| KR | 2001-0098007 | 11/2001 |
| KR | 2001-0107578 | 12/2001 |
| KR | 2002-0006273 | 1/2002 |
| KR | 2002-0020919 | 3/2002 |
| KR | 2002-0097454 | 12/2002 |
| KR | 2002-0097455 | 12/2002 |
| RU | 2142167 | 11/1999 |
| WO | WO 97/13366 | 4/1997 |
| WO | WO 97/14151 | 4/1997 |
| WO | WO97/15924 | 5/1997 |
| WO | WO 97/37491 | 10/1997 |
| WO | WO 97/38527 | 10/1997 |
| WO | WO 97/39451 | 10/1997 |
| WO | WO99/08281 | 2/1999 |
| WO | WO 99/38169 | 7/1999 |
| WO | WO 00/02195 | 1/2000 |
| WO | WO 00/04726 | 1/2000 |
| WO | WO 00/46803 | 8/2000 |
| WO | WO00/60597 | 10/2000 |
| WO | WO 01/35648 | 5/2001 |
| WO | WO01/52554 | 7/2001 |
| WO | WO01/82604 | 11/2001 |
| WO | WO01/82606 | 11/2001 |
| WO | WO01/82610 | 11/2001 |
| WO | WO 02/32127 | 4/2002 |
| WO | WO 02/062061 | 8/2002 |
| WO | WO 02/075739 | 9/2002 |
| WO | WO02/080541 | 10/2002 |
| WO | WO03/047261 | 6/2003 |
| WO | WO03/058957 | 7/2003 |
| WO | WO2004/001728 | 12/2003 |
| WO | WO2004/001750 | 12/2003 |
| WO | WO2004/001752 | 12/2003 |
| WO | WO2004/001753 | 12/2003 |
| WO | WO2004/001754 | 12/2003 |
| WO | WO 2004/032142 | 4/2004 |
| WO | WO 2004/047100 A1 | 6/2004 |
| WO | WO 2004/088661 A1 | 10/2004 |

OTHER PUBLICATIONS

Japanese Office Action dated May 7, 2008.
United States Office Action dated May 15, 2008.
United States Office Action dated May 21, 2008.
United States Office Action dated Apr. 4, 2008.
Japanese Office Action dated Jun. 20, 2008.
Japanese Office Action dated Jun. 27, 2008.
United States Office Action dated Jul. 3, 2008.
United States Office Action dated Jul. 25, 2008.
United States Office Action dated May 14, 2008.
Japanese Office Action dated May 20, 2008.
European Search Report dated Sep. 12, 2008.
Japanese Office Action corresponding to Japanese Application No. 2004-553264 dated Sep. 16, 2008.
Australian Office Action corresponding to Australian Application No. 2003241205 dated Sep. 11, 2008.
Australian Office Action corresponding to Australian Application No. 2003240036 dated Sep. 11, 2008.
Australian Office Action corresponding to Australian Application No. 2003228113 dated Sep. 17, 2008.

Ralph Labarge: "DVD Authorizing & Production" 2001, CMP Books, CMP Media LLC, Lawrence, Kansas, US, XP-002523445, pp. 185, 186, 189, 198-203, 209-210, 216-220.
European Search Report dated May 18, 2009.
English translation of Russian Search Report dated Jun. 29, 2009.

Taiwanese Office Action dated Feb. 3, 2010 with English translation for corresponding Taiwanese Application No. 92129965.
English translation of Chinese Office Action dated Sep. 25, 2009.

* cited by examiner

*Program Chain Command Table (PGC_CMDT)*

FIG. 4

*System Parameters (SPRMs)*

| SPRM | Meaning |
| --- | --- |
| 0 | Menu Description Language Code (M_LCD) |
| 1 | Audio stream number (ASTN) for TT_DOM |
| 2 | Sub-picture stream number (SPSTN) and On/Off flag for TT_DOM |
| 3 | Angle number(AGLN) for TT_DOM |
| 4 | Title number (TTN) for TT_DOM |
| 5 | VTS Title PGC number (VTS_TTN) for TT_DOM |
| 6 | Title PGC number (TT_PGCN) for TT_DOM |
| 7 | Part_of_Title number (PTTN) for One_Sequential_PGC_Title |
| 8 | Highlighted Button number (HL_BTN) for Selection state |
| ... | ... |
| 20 | Player Region Code |
| 21 | *Title cell number(TT_CellN) for TT_DOM* |
| 22 | *VTSN* |
| 23 | *NV_PCK start address for TT_DOM* |
| 24 | *PGC playback control status* |
| 25 | *Resumable flag* |

RECORDING MEDIUM HAVING DATA STRUCTURE FOR MANAGING TO RESUME REPRODUCTION OF VIDEO DATA RECORDED THEREON AND RECORDING AND REPRODUCING METHODS AND APPARATUSES

FOREIGN PRIORITY

The present invention claims priority under 35 U.S.C. 119 on Korean Application No. 10-2003-021251 filed Apr. 4, 2003; the contents of which are incorporated by reference in their entirety.

BACKGROUND OF THE INVENTION

1. Field of the Invention

The present invention relates to a recording medium having a data structure for managing to resume reproduction of data including at least video data recorded thereon as well as methods and apparatuses for reproduction and recording the data structure.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

In addition, the standardization for high-density read-only optical disks such as the Blu-ray ROM (BD-ROM) and the high-density DVD (HD-DVD) is also under way. The BD-ROM and HD-DVD can store various applications such as game software as well as at least video data such as movie titles. If a user requests other operation, e.g., menu display during reproduction of such contents recorded on the BD-ROM or the HD-DVD, it will be a problem to permit resumption of the stopped contents or not. However, an effective data structure for managing to resume reproduction of video and audio data, etc. recorded on the high-density read-only optical disk such as a BD-ROM or a HD-DVD is not yet available.

SUMMARY OF THE INVENTION

It is an object of the present invention to provide a recording medium having a data structure for effectively managing to resume reproduction of data recorded thereon, and methods and apparatuses for recording and reproducing the video data on such a recording medium.

It is another object of the present invention to provide a recording medium having a data structure for enabling selective resumption of data reproduction, and methods and apparatuses for recording and reproducing the video data on such a recording medium.

A recording medium having a data structure according to the present invention has data recorded thereon comprising: at least one data playing unit including video data; and navigation information for managing the data playing unit, wherein the navigation information includes control information to indicate whether resumption of the data playing unit is permitted or not.

A recording medium having another data structure according to the present invention has data recorded thereon comprising: menu data; at least one data playing unit including video data; and navigation information for managing the data playing unit, wherein the navigation information includes control information to indicate a behavior on the data playing unit when reproduction of the menu data is called during reproduction of the data playing unit.

A recording medium having another data structure according to the present invention has data recorded thereon comprising: menu data; at least one data playing unit including video data; and navigation information for managing the data playing unit, wherein the navigation information includes control information to indicate whether or not to store current reproduction location on the data playing unit when reproduction of the menu data is called during reproduction of the data playing unit.

A recording medium having another data structure according to the present invention has data recorded thereon comprising: menu data; at least one data playing unit including video data; and navigation information for managing the data playing unit, wherein the navigation information includes control information to indicate whether or not to update location information to resume from, when reproduction of the menu data is called during reproduction of the data playing unit.

In one embodiment, the data playing unit is a data section specified by a movie object defined in a BD-ROM.

In another embodiment, the data playing unit is a title or a program chain defined in an HD-DVD.

The present invention further provides apparatuses and methods for recording and reproducing the data structure according to the present invention, and recording and reproducing according to the present invention.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
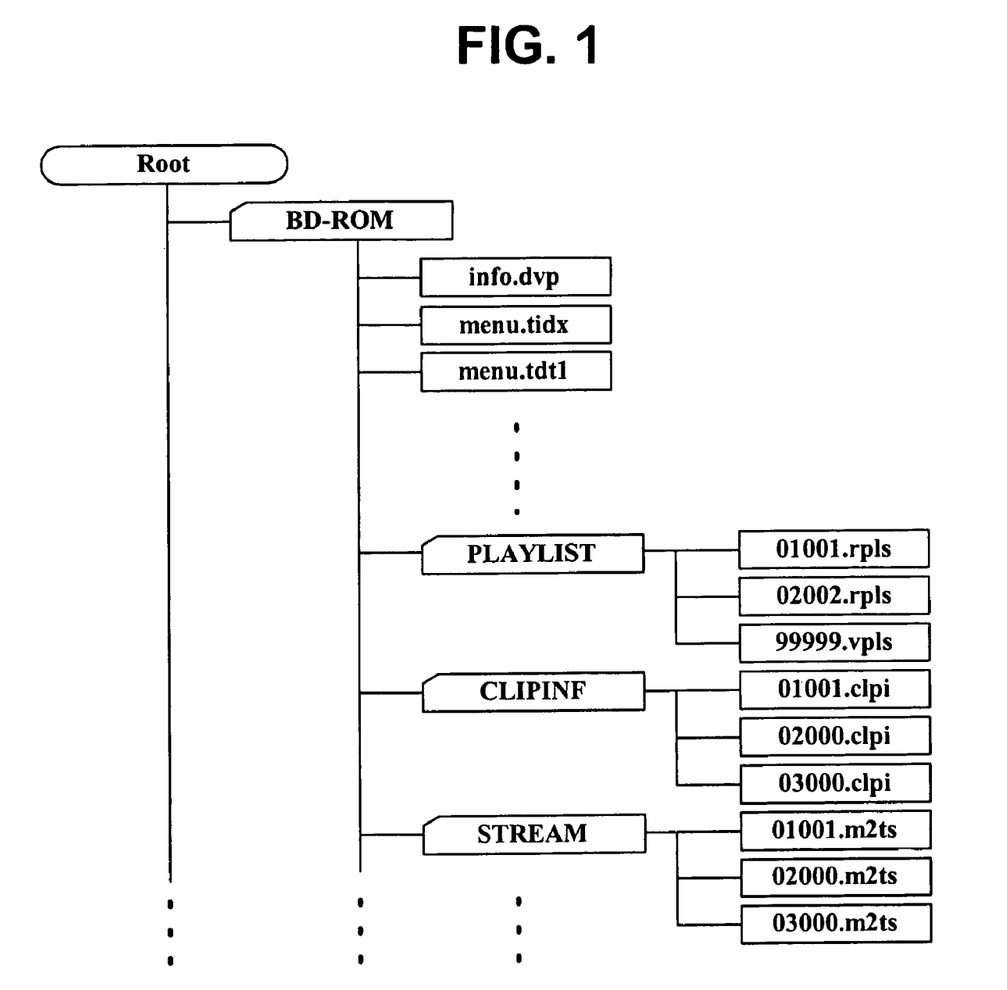
FIG. 1 illustrates an exemplary embodiment of a recording medium file or data structure according to the present invention.

A high-density optical disk, for example, a Blu-Ray ROM (BD-ROM) in accordance with the invention may have a file or data structure for managing reproduction of video and audio data as shown in FIG. 1. Many aspects of the data structure according to the present invention shown in FIG. 1 are similar to that of the BD-RE standard.

As shown in FIG. 1, the root directory contains at least one BD-ROM directory. The BD-ROM directory includes a general information file info.dvp, menu data files menu.tidx, menu.tdt1 among others, a PLAYLIST directory in which playlist files (e.g., real (*.rpls) and virtual (*.vpls)) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clips. The STREAM directory may also include menu data as well as a clip file containing at least video stream for an application. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number).

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip (e.g., presentation time stamps on an ATC or STC basis). Expressed another way, the playlist file identifies playitems, each playitem points to a clip or portion thereof and identifies the clip information file associated with the clip. The clip information file is used, among other things, to map the playitems to the clip of source packets.

A playlist directory may include real playlists (*.rpls) and virtual playlists (*.vpls). A real playlist can only use clips. Namely, the real playlist is considered as referring to parts of clips, and therefore, conceptually considered equivalent in disk space to the referred to parts of the clips.

The info.dvp file is a general information file that provides general information for managing the reproduction of the A/V streams recorded on the optical disk. More specifically, the info.dvp file includes, among other things, a table of playlists that identifies the file names of the playlists in the PLAYLIST directory.

Figure 2:
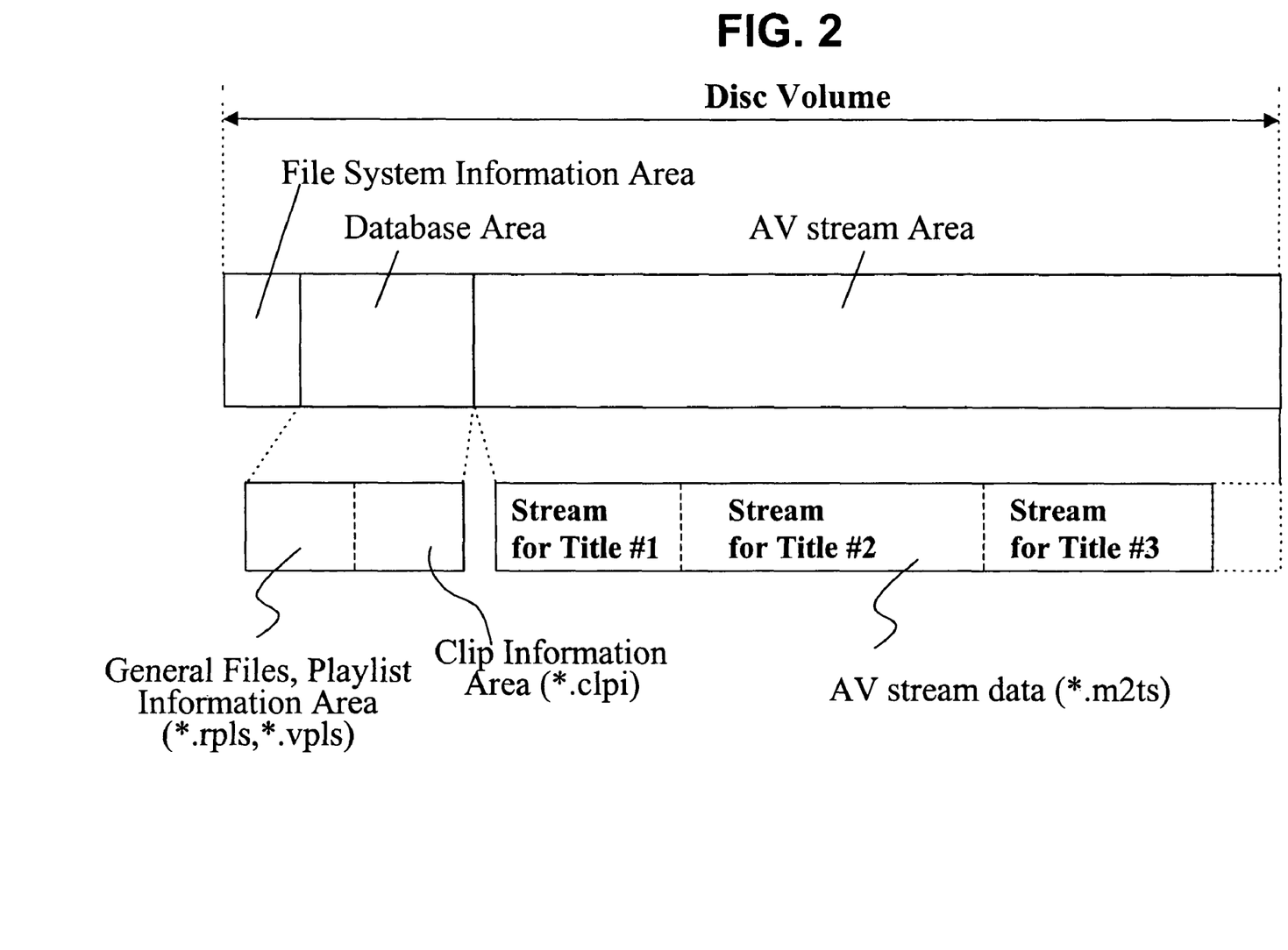
FIG. 2 illustrates an example of a recording medium having the data structure of FIG. 1 stored thereon.

In addition to illustrating the data structure of the recording medium according to an embodiment of the present invention, FIG. 1 represents the areas of the recording medium. For example, the general information file is recorded in one or more general information areas, the playlist directory is recorded in one or more playlist directory areas, each playlist in a playlist directory is recorded in one or more playlist areas of the recording medium, etc. FIG. 2 illustrates an example of a recording medium having the data structure of FIG. 1 stored thereon. As shown, the recording medium includes a file system information area, a data base area and an A/V stream area.

The data base area includes a general information file and playlist information area and a clip information area. The general information file and playlist information area have the general information file recorded in a general information file area thereof and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters. In addition, a title may accompany an auxiliary title called a bonus title. An application title such as games is mainly such a case.

As will be described in detail below with respect to embodiments of the present invention, the data structures according to the present invention comprise navigation information for managing to resume reproduction of data including at least video data recorded on the recording medium.

The data structures writing according to the present invention may be applicable to the manufacturing process in case of a read-only disk like BD-ROM.

Figure 3:
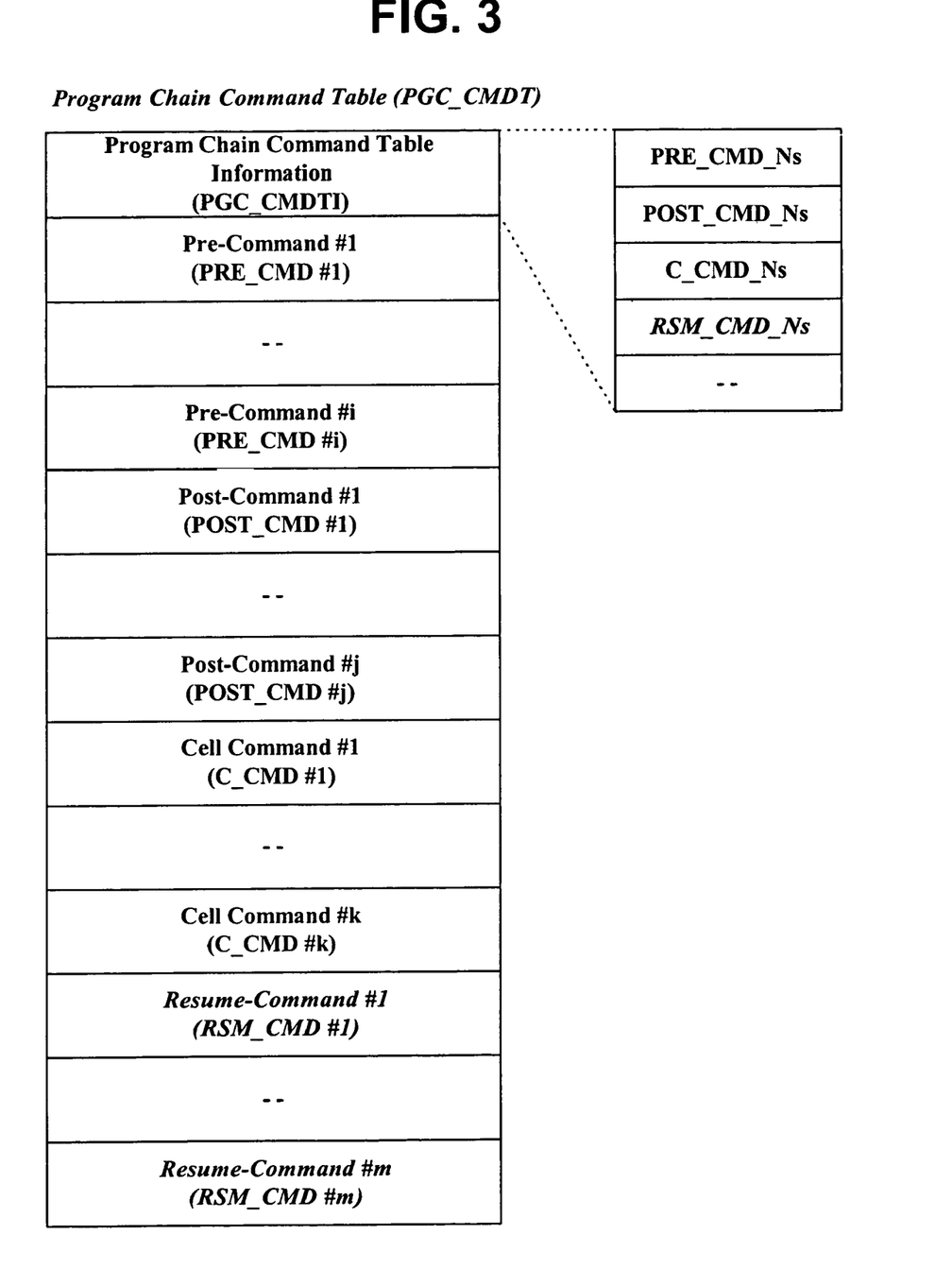
FIG. 3 shows a program chain command table organized in accordance with the present invention.

FIG. 3 shows navigation information, especially program chain command table 'PGC_CMDT' used for controlling data stream stored as above. The table includes program chain command table information 'PGC_CMDTI', a plurality of pre-commands 'PRE_CMDs #1 to #k', a plurality of post-commands 'POST_CMDs #1 to #k', and a plurality of cell commands 'C_CMDs #1 to #k', and a plurality of "resume" commands 'RSM_CMDs #1 to #m'.

The program chain command table information 'PGC_CMDTI' has information about the number of pre-commands 'PRE_CMD_Ns', the number of post-commands 'POST_CMD_Ns', the number of cell commands 'C_CMD_Ns', and the number of "resume" commands 'RSM_CMD_Ns'.

The above-mentioned and below-explained navigation information is recorded within a specific recording area or as a management file whose location is not fixed within a certain area. For example, the navigation information is recorded within the database area of the data structure shown in FIG. 2 in case of a BD-ROM while it is recorded as a management file located next to an area where relevant titles are recorded in case of an HD-DVD.

Figure 4:
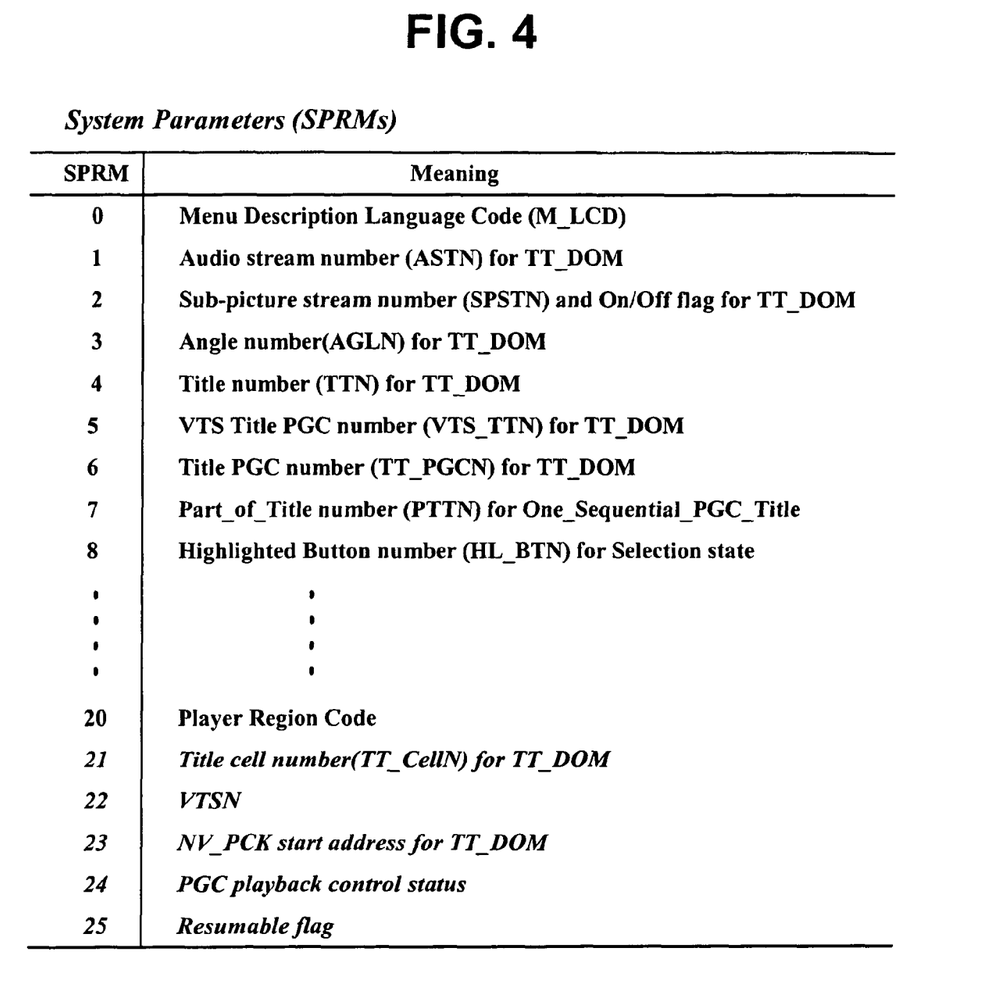
FIG. 4 shows a system parameter table whose fields are filled with navigation information of a title to be reproduced in accordance with the present invention.

An apparatus for reproducing a recording medium such as HD DVD or BD-ROM reads navigation information related with a chosen title first and stores as a part of system parameter table (SPT) in a built-in memory when reproducing titles recorded on the recording medium. The SPT is organized as shown in FIG. 4. The information written in the SPT is changed each time a title is changed.

The SPT shown in FIG. 4 consists of 26 fields 'SPRMs [0] to [25]'. The fifth field 'SPRM [4]' allocated for title domain 'TT_DOM' is for title number, and the sixth field 'SPRM [5]' for title domain is for title PGC number of a video title set. The seventh field 'SPRM [6]' for title domain is for title PGC (ProGram Chain) number, the eighth field 'SPRM [7]' is for part of title 'POT' number for one sequential PGC title, and the ninth field 'SPRM [8]' is for highlighted button number for selection state.

Specially, the 22nd to 26th fields 'SPRMs [21] to [25]' are reserved for reproduction control information for "resume" function. In detail, the 22nd field 'SPRM [21]' allocated for title domain stores title cell number, the 23rd field 'SPRM [22]' stores video title set number, the 24th field 'SPRM [23]' for title domain stores start address of a navigation pack, and the 25th field 'SPRM [24]' stores playback control status of a PGC.

The last field 'SPRM [25]' stores a flag indicative of resumability of a corresponding title. This resumable flag is copied therein from navigation information of a chosen title as other information is done.

The value '1' written in the flag indicates that it is possible to resume reproduction of a corresponding title from a menu domain while the value '0' indicates that resumption of a corresponding title is not permitted.

Reproduction control methods for resume function in accordance with the present invention are described in detail below.

When a certain title is chosen to be reproduced, a disk reproducing apparatus reads navigation information associated with the chosen title from an inserted recording medium and fills the necessary fields of the SPT of FIG. 4 organized in a memory with a part of the read navigation information. Specially, the apparatus copies to the 26th field 'SPRM [25]' of the SPT from the resumable flag that is written in a program chain information table 'PGCIT' of the title in case of an HD-DVD or written in a current movie object pertaining to the title in case of a BD-ROM. The latter case specifies resumability in the unit of data section specified by each movie object. A program chain defined for an HD-DVD is corresponding to a title while at least one movie object defined for a BD-ROM constitutes a title wherein each movie object points to a playlist specifying the playing sequence of at least one A/V clip.

Figure 5:
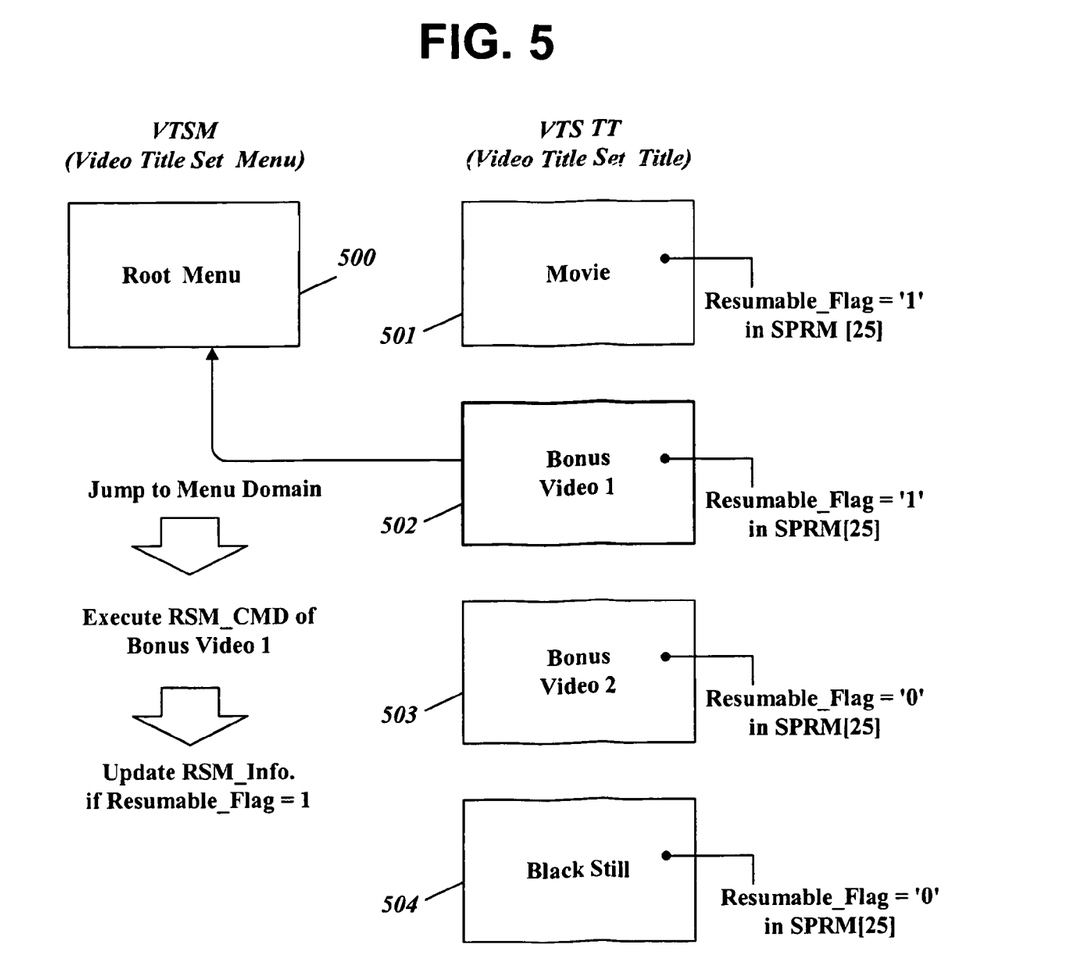
FIG. 5 illustrates a preferable first embodiment of controlling resuming process in accordance with the present invention.

FIG. 5 shows an exemplary reproduction case where a title set consists of a main movie title 501 and three auxiliary titles (two bonus titles 502 and 503 and one still picture title 504). In the example, resuming is permitted in the main movie title 501 and the first bonus title 502 but not in remaining two auxiliary titles 503 and 504. That is, ones (1s) are written in the resumable flags respectively allocated in program chain information tables of the main movie title 501 and the first bonus title 502, and zeros (0s) are written in the resumable flags in respective program chain information tables of the remaining two auxiliary titles 503 and 504.

If the main movie title 501 is selected by a user from title domain including the above title set, the disk reproducing apparatus starts to reproduce the main movie title 501. If title change to the first bonus title 502 is requested by a user or navigation information of the main movie title during the reproduction of the main movie title 501, the disk reproducing apparatus jumps to the first bonus title 502. At this time, resumable flag of the main movie title 501 being reproduced is ignored because of jump between titles, and a part of fields of the SPT stored in a memory is changed to navigation information of the first bonus title 502. In the illustrative embodiment of FIG. 5, the 26th field 'SPRM [25]' of the SPT is set to '1' because the resumable flag of the first bonus title 502 is one.

If jump to a root menu included in a menu domain is commanded from a user during reproduction of the first bonus title 502, the disk reproducing apparatus reads and executes resume command 'RSM_CMD #i' associated with the first bonus title 502 in the program chain command table organized as FIG. 3. The execution of the resume command involves the following operations.

First, the stored resumable flag is checked, and if it is '1' information to identify current reproduction location is stored in the fields [4] to [8] and [21] to [24] of the SPT as resume information (RSMI). Such information storing means that reproduction of the current title is suspended. If the resumable flag is zero current title is discarded, that is, current reproduction location is not memorized in the SPT.

Figure 6:
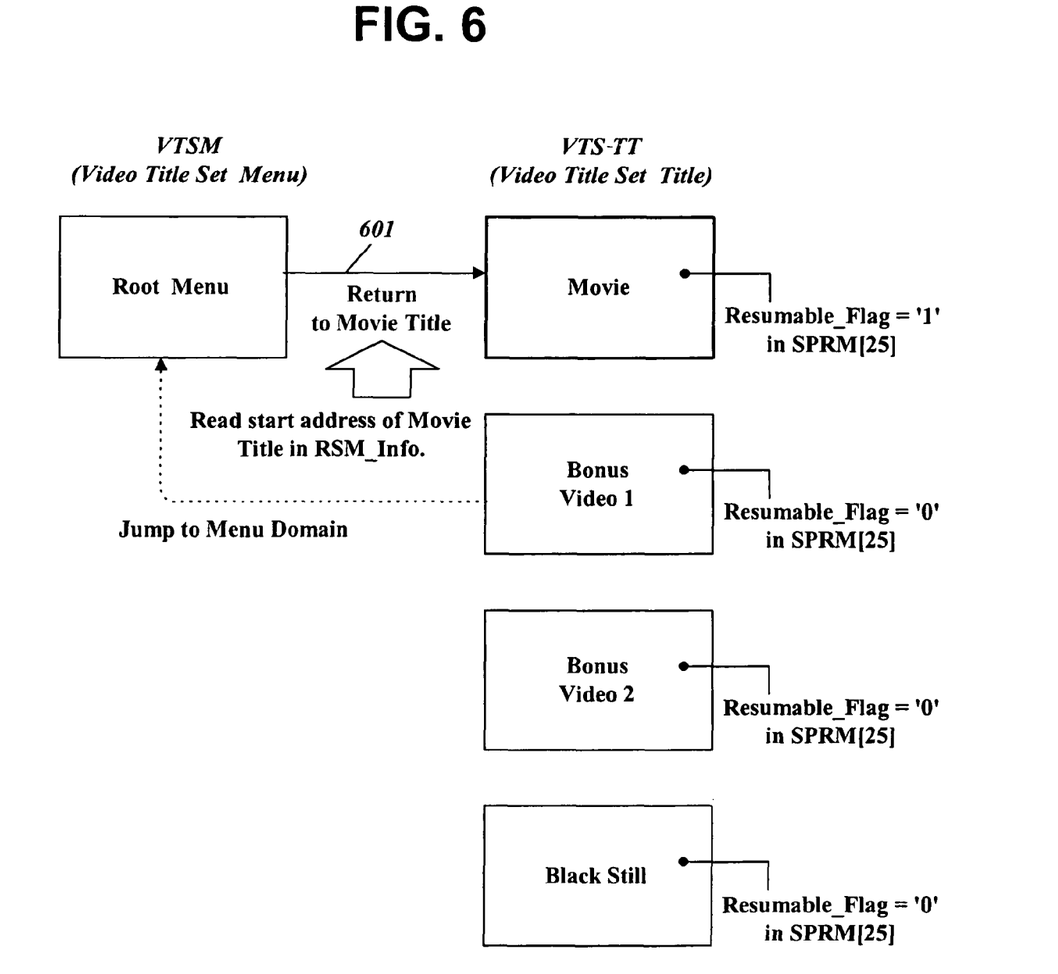
FIG. 6 illustrates a preferable second embodiment of controlling resuming process in accordance with the present invention.

The resumable flag having zero is handled differently. That is, start location of a specific title, e.g., the main movie title among current title set is stored as RSMI in the SPT instead of current reproducing location in the event that the resumable flag is zero (resume function is not permitted). In this case, although resumption from menu domain to title domain is requested, reproduction can not starts from the previous reproducing location on the title domain. Instead, reproduction begins from a predetermined specific location, e.g., start location of the main movie title as illustrated (601) in FIG. 6. Consequently, the resume function is not performed in case of zero in the resumable flag.

On the other hand, after jumping to menu domain on the recording medium, the disk reproducing apparatus reads and presents root menu data included the menu domain and conducts a menu operation commanded by a user through the presented menu. Afterwards, if resumption is commanded, the disk reproducing apparatus searches for a previous reproducing position on a title, e.g., the first bonus title with reference to the stored RSMI and then resumes reproduction of the bonus title therefrom. If RSMI is not stored the requested resuming operation is not conducted.

Next, another embodiment of the present invention is explained. In this embodiment, if jump from a title domain to a menu domain is commanded, current reproducing location is stored as RSMI in the SPT irrespective of the resumable flag of a current title, e.g., the first bonus title 502. The resumable flag stored in the SPT is checked when returning to the title domain.

In other words, if resumption is commanded after conducting a menu operation commanded by a user through the presented menu. the disk reproducing apparatus checks the resumable flag stored in the SPT. If the stored resumable flag is '1', the disk reproducing apparatus searches for a previous reproducing position on a title, e.g., the first bonus title with reference to the stored RSMI and then resumes reproduction of the title therefrom. If the resumable flag is zero the requested resuming operation is discarded.

Figure 7:
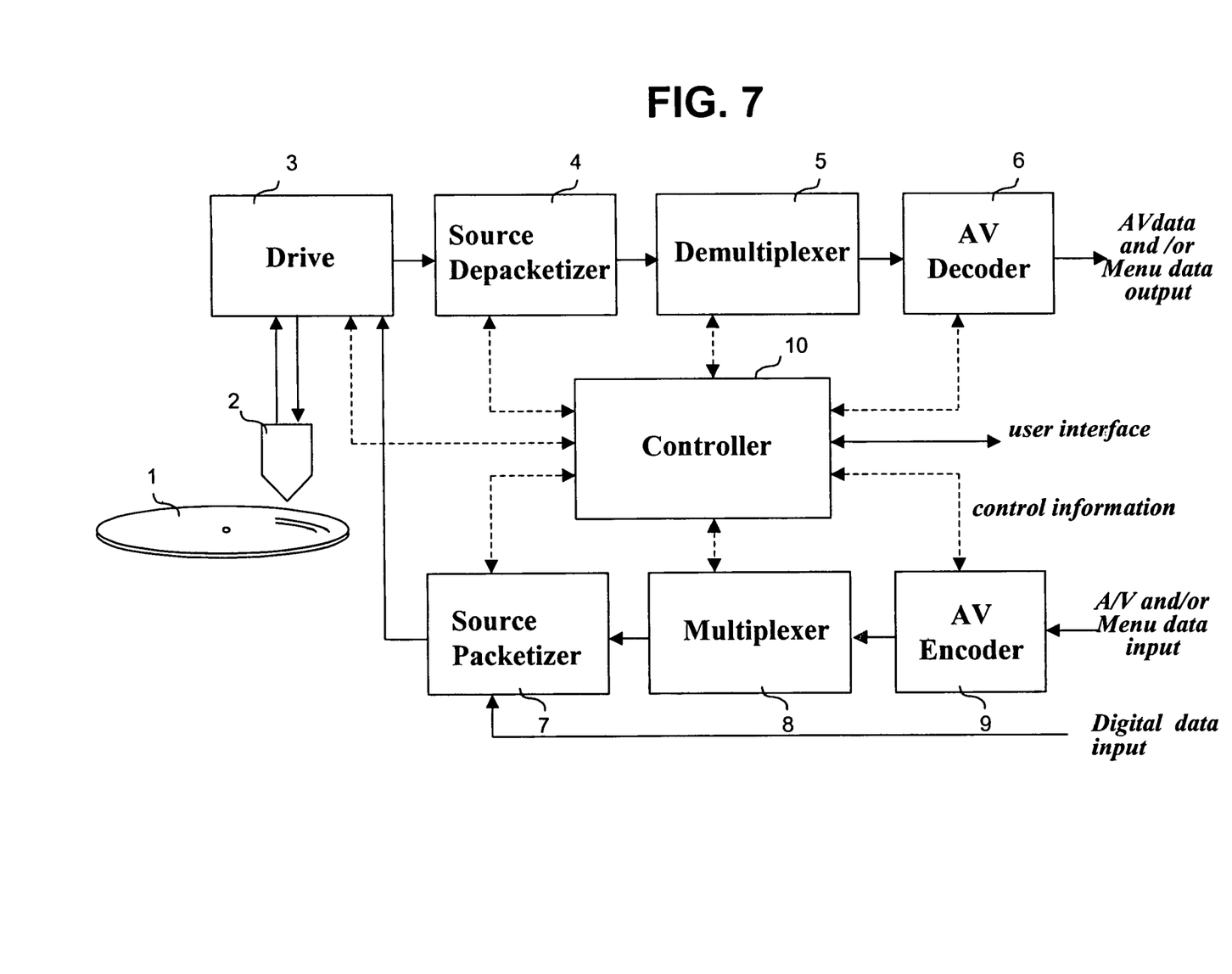
FIG. 7 illustrates a schematic diagram of an embodiment of an optical disk recording and reproducing apparatus according to the present invention.

FIG. 7 illustrates a schematic diagram of an embodiment of an optical disk recording and reproducing apparatus according to the present invention. As shown, an AV encoder 9 receives and encodes audio and video data (or menu data). The AV encoder 9 outputs the encoded audio and video data along with coding information and stream attribute information. A multiplexer 8 multiplexes the encoded audio and video data based on the coding information and stream attribute information to create, for example, an MPEG-2 transport stream. A source packetizer 7 packetizes the transport packets from the multiplexer 8 into source packets in accordance with the audio/video format (or menu data format) of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type (A/V or menu data) of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates menu data and the navigation information for managing reproduction of the audio/video data being recorded on the optical disk. For example, based on information received via the user interface (e.g., instruction set saved on disk, provided over an intranet or internet by a computer system, etc.) the controller 10 controls the drive 3 to record necessary menu data and the data structure of FIGS. 1 and 2 and movie object related information (in case of BD-ROM) or program chain related information (in case of HD-DVD) on the optical disk.

In the process of reproduction, the controller 10 controls the drive 3 to reproduce this data structure from the optical disk. Based on the information contained therein, as well as user input received over the user interface (e.g., control buttons on the recording and reproducing apparatus or a remote associated with the apparatus), the controller 10 controls the drive 3 to reproduce the audio/video source packets from the optical disk. For example, the user input may specify a title to reproduce from a title domain or a menu from menu domain. This user input may be specified, for example, via a menu based graphical user interface preprogrammed into the controller 10. Using the user input and the navigation information reproduced from the optical disk, the controller 10 controls the reproduction of a title or a menu.

For example, if a title is chosen from a title domain, navigation information associated with the chosen title (or movie object included therein) is examined and is partly copied into the SPT by the controller 10. At this time, the resumable flag of the chosen title (or movie object) is copied. Afterwards, the chosen title (or movie object) is reproduced. If a menu is called during reproduction of the title (or movie object), the controller 10 checks the resumable flag in the SPT. If the flag is '1' the controller 10 stores current location identifiable information as RSMI (RSMI is updated at this time), otherwise it ignores, namely it discards the current title (or movie object) being reproduced. If resumption is requested in the state of menu reproduction, the controller 10 searches for video stream location of the title (or movie object) pointed by the stored (updated) RSMI and begins to reproduce therefrom. If the RSMI had not been updated, previously-stored or initially-stored RSMI for a specific location, e.g., start of the title begins to be reproduced by the controller 10.

The reproduced source packets are received by a source depacketizer 4 and converted into a data stream (e.g., an MPEG-2 transport packet stream). A demultiplexer 5 demultiplexes the data stream into encoded video and audio data. An AV decoder 6 decodes the encoded video and audio data to produce the original audio and video data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

The present invention, disclosed with respect to a limited number of embodiments, provides a greater level of changeability between title domain and menu domain in the reproduction of video data and/or various applications.

While the invention has been disclosed with respect to a limited number of embodiments, those skilled in the art, having the benefit of this disclosure, will appreciated numerous modifications and variations therefrom. It is intended that all such modifications and variations fall within the spirit and scope of the invention.

What is claimed is:

1. A recording medium having a data structure for managing reproduction of video data, the data structure comprising:
   at least one stream file including source packets of the video data, the video data including a plurality of titles; and
   navigation information for managing reproduction of the video data, the navigation information including,
      at least one clip information file associated with the stream file, the clip information file including timing information mapping presentation time stamps to the source packets,
      at least one playlist file including at least one playitem identifying a playing interval in a clip of the video data, and
      a movie object pointing to the playlist list file, the movie object including a resume flag indicating whether resumption of reproduction of the video data at a suspended position is permitted or prohibited, the resume flag indicating that, when a resume command for a second title of the plurality of titles is executed, the resumption of the second title is prohibited and a first title of the plurality of titles is reproduced instead.

2. The recording medium of claim 1, wherein the movie object further includes commands to conduct operations according to value of the resume flag.

3. The recording medium of claim 1, wherein the first title is a movie title, and wherein the second title is a game title.

4. The recording medium of claim 1, wherein the movie object is discarded when the resumption is prohibited.

5. The recording medium of claim 1, wherein the movie object is suspended and maintained when the resumption is permitted.

6. A method for recording a data structure for managing reproduction of video data on a recording medium, the method comprising:
   recording at least one stream file including source packets of the video data, the video data including a plurality of titles; and
   recording navigation information for managing reproduction of the video data, the navigation information including,
      at least one clip information file associated with the stream file, the clip information file including timing information mapping presentation time stamps to the source packets,
      a playlist filet least one including at least one playitem identifying a playing interval in a clip of the video data, and a movie object pointing to the playlist list file, the movie object including a resume flag indicating whether resumption of reproduction of the video data at a suspended position is permitted or prohibited, the resume flag indicating that, when a resume command for a second title of the plurality of titles is executed, the resumption of the second title is prohibited and a first title of the plurality of titles is reproduced instead.

7. The method of claim 6, wherein the movie object further includes commands to conduct operations according to value of the resume flag.

8. The method of claim 6, wherein the first title is a movie title, and wherein the second title is a game title.

9. An apparatus for recording a data structure for managing reproduction of video data on a recording medium, the apparatus comprising:
   a recording unit configured to record data on the recording medium; and
   a controller configured to control the recording unit to record at least one stream file including source packets of the video data and to record navigation information for managing reproduction of the video data, the video data including a plurality of titles, the navigation information including,
      at least one clip information file associated with the stream file, the clip information file including timing information mapping presentation time stamps to the source packets,
      at least one playlist file including at least one playitem identifying a playing interval in a clip of the video data, and
      a movie object pointing to the playlist list file, the movie object including a resume flag indicating whether resumption of reproduction of the video data at a suspended position is permitted or prohibited, the resume flag indicating that, when a resume command for a second title of the plurality of titles is executed, the resumption of the second title is prohibited and a first title of the plurality of titles is reproduced instead.

10. The apparatus of claim 9, wherein the movie object further includes commands to conduct operations according to value of the resume flag.

11. The apparatus of claim 9, wherein the first title is a movie title, and wherein the second title is a game title.

12. A method for reproducing a data structure for managing reproduction of video data recorded on a recording medium, the method comprising:
   reading navigation information for managing reproduction of the video data from the recording medium;
   reproducing at least one stream file including source packets of the video data from the recording medium, the video data including a plurality of titles, the navigation information including,
      at least one clip information file associated with the stream file, the clip information file including timing information mapping presentation time stamps to the source packets,
      at least one playlist file including at least one playitem identifying a playing interval in a clip of the video data, and
      a movie object pointing to the playlist list file, the movie object including a resume flag indicating whether resumption of reproduction of the video data at a suspended position is permitted or prohibited, the resume flag indicating that, when a resume command for a second title of the plurality of titles is executed, the resumption of the second title is prohibited; and
   reproducing, based on the resume flag, a first title of the plurality of instead of the second title when a resume command for a second title of the plurality of titles is executed.

13. The method of claim 12, further comprising:
   storing current reproduction location of the video data, based on value of the resume flag.

14. The method of claim 13, further comprising:
   resuming reproduction of the video data from the stored reproduction location after presenting a menu.

15. The method of claim 12, further comprising:
   discarding the movie object if the resumption is prohibited.

16. The method of claim 12, wherein the movie object further includes commands to conduct operations according to value of the resume flag.

17. The method of claim 12, wherein the first title is a movie title, and wherein the second title is a game title.

18. The method of claim 12, further comprising:
   suspending and maintaining the movie object if the resumption is permitted.

19. An apparatus for reproducing a data structure for managing reproduction of video data recorded on a recording medium, the apparatus comprising:
   a reproducing unit configured to reproduce data from the recording medium; and
   a controller configured to control the reproducing unit to read navigation information for managing reproduction of the video data from the recording medium and to reproduce at least one stream file including source packets of the video data from the recording medium, the video data including a plurality of titles, the navigation information including,
      at least one clip information file associated with the stream file, the clip information file including timing information mapping presentation time stamps to the source packets,
      at least one playlist file including at least one playitem identifying a playing interval in a clip of the video data, and
      a movie object pointing to the playlist list file, the movie object including a resume flag indicating whether resumption of reproduction of the video data at a suspended position is permitted or prohibited, the resume flag indicating that, when a resume command for a second title of the plurality of titles is executed, the resumption of the second title is prohibited and a first title of the plurality of titles is reproduced instead.

20. The apparatus of claim 19, wherein the controller controls the reproducing unit to store current reproduction location of the video data, based on value of the resume flag.

21. The apparatus of claim 19, wherein the movie object further includes commands to conduct operations according to value of the resume flag.

22. The apparatus of claim 19, wherein the first title is a movie title, and wherein the second title is a game title.

* * * * *